United States Patent [19]
Teeny

[11] 3,821,862
[45] July 2, 1974

[54] FLIES AND METHODS OF MAKING SAME

[76] Inventor: Jim A. Teeny, 915 N.E. 108th, Portland, Oreg. 97220

[22] Filed: June 20, 1972

[21] Appl. No.: 264,626

[52] U.S. Cl. ............................... 43/42.25, 43/42.53
[51] Int. Cl. ............................................... A01k 85/08
[58] Field of Search ........................ 43/42.25, 42.53

[56] References Cited
UNITED STATES PATENTS

| | | | |
|---|---|---|---|
| 1,009,363 | 11/1911 | Winnie | 43/42.25 |
| 1,388,156 | 8/1921 | Allen | 43/42.25 |
| 2,034,832 | 3/1936 | Raycraft | 43/42.25 |
| 2,093,585 | 9/1937 | Woodhead et al | 43/42.25 |
| 2,575,248 | 11/1951 | Clark | 43/42.25 X |
| 2,618,094 | 11/1952 | Shindler | 43/42.53 X |

Primary Examiner—Robert Peshock
Assistant Examiner—Daniel J. Leach
Attorney, Agent, or Firm—Klarquist, Sparkman, Campbell, Leigh, Hall & Whinston

[57] ABSTRACT

Forwardly extending butt portions of barbs of a tail feather from a Chinese pheasant are bound by a thread to the rear portion of a shank of a hook and are closely wound forwardly on the shank to form a nymph body. The barbs are bound to the shank slightly ahead of the closely wound body and the free end portions are folded back and the thread is wound thereover to hold them in downwardly and rearwardly extending positions to form legs. Then, for a smaller fly, the thread is wound into a head, or for a double fly, a second group of barbs are secured to the forward portion of the shank in a like manner to form a second body with legs after which a head is formed.

13 Claims, 8 Drawing Figures

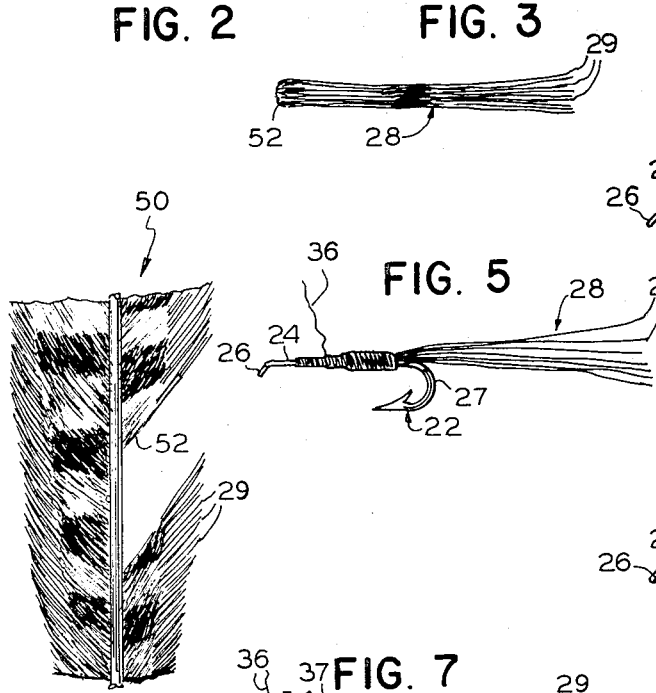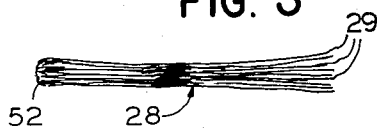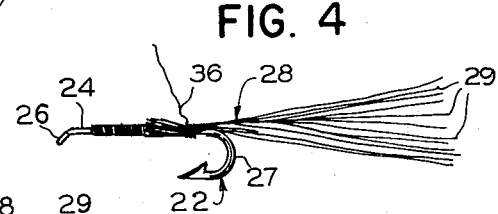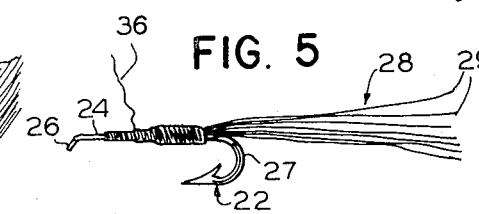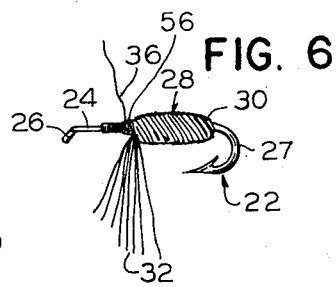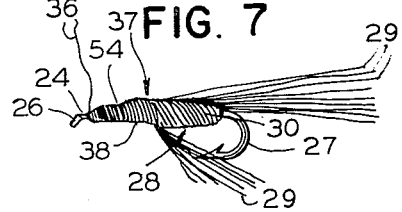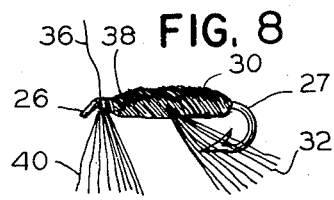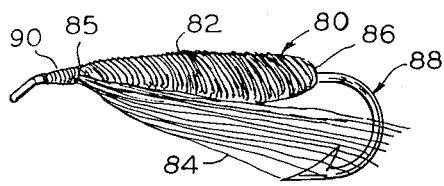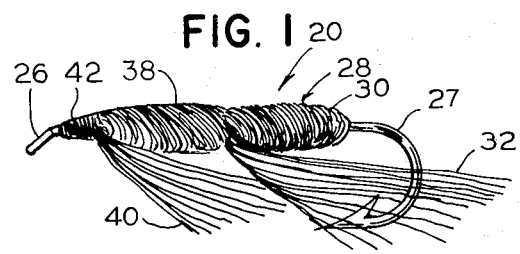

FLIES AND METHODS OF MAKING SAME

DESCRIPTION

This invention relates to new and improved flies and methods of making flies, and more particularly to new and improved nymph-like flies and methods of making nymphs.

An object of the invention is to provide new and improved flies.

Another object of the invention is to provide new and improved methods of making flies.

A further object of the invention is to provide new and improved nymph-like flies.

Another object of the invention is to provide new and improved methods of making nymph-like flies.

Another object of the invention is to provide a nymph-like fly having a body of the portions of barbs of a pheasant tail nearer the butt ends of the feather and legs of the tip end portions of the same barbs that form the body and folded back on and secured to the body at the forward ends of the legs.

Another object of the invention is to provide a nymph-like fly having a body of a multitude of semi-stiff strands and legs of the end portions of the same strands.

Another object of the invention is to provide a nymph-like fly having a rear body portion of semi-stiff strands and rear legs of the end portions of the same strands, a forward body portion like the rear body portion and forward legs like the rear legs.

Another object of the invention is to provide a method of making a nymph-like fly wherein a multitude of semi-stiff strands are wound on a shank of a hook to form a body and end portions of the strands are folded back partially along the body and are bound in such positions.

Another object of the invention is to provide a method of making a nymph-like fly including binding butt end portions of barbs to a shank of a hook, winding the barbs on the shank to form a body, folding the tip portions of barbs back from a point forward of the body, and binding short portions of the tip portions adjacent to the body on the shank and body.

Another object of the invention is to provide a method of making a nymph-like fly including winding portions of barbs except for tip portions of the barbs on a shank of a hook and binding the butt ends of the tip portions to the shank to form legs.

Another object of the invention is to provide a method of making a fly including securing portions of barbs more adjacent the butt ends thereof to a shank to form a body and securing tip end portions of the same barbs to the shank in positions projecting at least somewhat laterally of the shank.

Another object of the invention is to provide a method of making a fly in which a first group of similar hackle strands are formed into a first body and hook projections on a rear portion of a shank of a hook and then a second group of similar hackle strands are formed into a second body and hackle projections on the forward portion of the shank just ahead of the first body.

In the drawings:

FIG. 1 is a side elevation view of a fly forming one embodiment of the invention;

FIG. 2 is a fragmentary view of a pheasant tail feather used in making the fly of FIG. 1;

FIG. 3 is a view of barbules from the feather of FIG. 1;

FIG. 4 is a side elevation view of the fly of FIG. 1 at one stage of its construction;

FIG. 5 is a side elevation view of the fly of FIG. 1 at a second stage of its construction;

FIG. 6 is a side elevation view of the fly of FIG. 1 at a third stage of its construction;

FIG. 7 is a side elevation view of the fly of FIG. 1 at a fourth stage of its construction;

FIG. 8 is a side elevation view of the fly of FIG. 1 at a still later stage of its construction; and, FIG. 9 is a side elevation view of a fly forming an alternate embodiment of the invention.

EMBODIMENT OF FIGS. 1 TO 8

Referring now in detail to the drawings, there is shown in FIGS. 1 to 8 a double-bodied nymph-like fly 20 forming one embodiment of the invention and made by a method forming one embodiment of the invention. The fly 20 includes a hook 22, which may be, for example, a number 6, 4, 2 or larger fly hook. The hook includes a shank 24, an eye 26 and a curved hook portion 27, and a group 28 of barbs 29 form both a rear body 30 and rear legs or hackle 32 and are tied to the rear half of the shank by a black tying thread 36 of cotton, silk, or the like. A second group 37 of the barbs 29 form both a body 38 and front legs or hackle 40, which are like the rear body 30 and the rear legs 32 and are tied to the front half of the shank. The thread 36 then is wound to form a head 42 and is tied off.

In making the fly in accordance with one method forming one embodiment of the invention the first group 28 of a desired number, twenty or thirty, for example, of barbs 29 are torn or cut from a feather 50 of a ring-necked or Chinese cock pheasant, and butt end portions 52 are bound tightly to the shank 24, in positions extending forwardly along the shank, by the thread 36, the latter having been wound on the shank. Then the thread is wound to the middle of the shank and secured there by a half-hitch. The tier then winds the barbs around the shank, pushing on the last wound portion always to tightly wind the barbs on the shank. When only tip portions of the barbs of slightly greater lengths than those desired for the legs have not been wound to form the rear body 30, the forward end of the rear body is held tightly on the shank and one or more turns of the thread are wound around a body extension portion 54 of the barbs to secure the portion 54 to the shank in a position extending primarily forwardly along the shank. Then the free tip end portions of the barbs are pushed or folded back along the extension portion and the thread is wound therearound to form a head-like portion 56 (see FIG. 6), which secures the tip end portions of the barbs in rearwardly and downwardly extending positions. Preferably the tip end portions extend at least slightly back of the point of the hook. If desired, a drop of cement may then be placed on the head-like portion 56.

Then, to form the front body 38 and front legs 40, the second group 37 of the barbs 29, approximately equal in number to the group 28, from the feather 50, is tied to the front half of the shank 24 in the same way as the first group was tied thereto to form the front body 38 and the front legs 40, the thread 36 being wound and tied off to form a tapered head 42 to which a drop of cement may be applied.

EMBODIMENT OF FIG. 9

A nymph-like fly 80 forming an alternate embodiment of the invention and formed by a method forming an alternate embodiment of the invention is like the fly 20 except that the fly 80 has only one body 82 and one group of legs or hackle 84. The body 82 and legs 84 are formed and secured by a black thread 85 to a shank 86 of a hook 88, which may be of any desired size, from size 14 to size 6 or 8, for example, in the same way that the rear body 30 and rear legs 32 are formed and secured to the hook 22. A head 90 is formed by the thread, which is then tied off. Cement then may be applied to the head, if desired.

While barbs other than those from the ringnecked pheasant tail feather may be used, the barbs from the pheasant tail are much preferred, being tough, of the desired degree of semi-stiffness and giving coloration and a ribbed or ragged surface and possibly unrecognized advantages, the above-described flies 20 and 80 being very effective lures for all kinds of trout, especially when trolled, cast, drifted or slowly retrieved. In fishing waters where large trout are known to be present and other lures and bait have been used but with little or no success, the flies 20 and 80 have consistently produced very large catches of large trout both when used by inexperienced anglers and when used by experts. If desired, barbs similar to the barbs 29 may be tied to the hooks ahead of the bodies to form wings, but it has been found that the flies 20 and 80 are very effective without wings.

What is claimed is:

1. In a fly,
a hook having a shank,
semi-stiff strands not connected to each other and having rear portions secured to the shank to form a body and front portions tied to the shank in positions extending at least somewhat laterally of the shank to form legs or hackle,
and a head portion on the shank at the front end of the body,
the rear portions of the strands forming substantially the entire body and the front portions of the strands forming substantially the entire legs or hackle.

2. The fly of claim 1 wherein the rear portions of the strands are secured to the rear end of the shank and are spiralled forwardly around the shank.

3. In a fly,
a hook having a shank,
semi-stiff strands having rear portions secured to the shank to form a body and front portions tied to the shank in positions extending at least somewhat laterally of the shank to form legs or hackle,
and a head portion on the shank at the front end of the body,
the rear portions of the strands forming substantially the entire body and the front portions of the strands forming substantially the entire legs or hackle,
the rear portions of the strands being secured to the rear end of the shank and spiralled forwardly around the shank,
no wings being present and all the front portions of the strands being secured in positions extending downwardly from the shank to make a shrimp-like appearance.

4. The fly of claim 2 wherein the strands are barbs of a ring-necked pheasant tail feather and the pointed ends form the legs or hackle.

5. The fly of claim 1 wherein the strands are barbs of a ring-necked pheasant tail feather and the pointed ends form the legs or hackle.

6. In a fly,
a hook having a shank,
semi-stiff strands having rear portions secured to the shank to form a body and front portions tied to the shank in positions extending at least somewhat laterally of the shank to form legs or hackle,
and a head portion on the shank at the front end of the body,
the rear portions of the strands forming substantially the entire body and the front portions of the strands forming substantially the entire legs or hackle,
no wings being present and all the front portions of the strands being secured in positions extending downwardly from the shank to make a shrimp-like appearance.

7. The fly of claim 6 wherein the strands are barbs of a ring-necked pheasant tail feather with the pointed ends forming the legs.

8. In a nymph-like fly,
a hook having a shank,
a body composed essentially of barbs of a feather bunched together and wound in a bundle on the shank,
and legs of pointed ends of the barbs of the feather secured to the shank.

9. The fly of claim 8 wherein the body and legs are integral portions of the same barbs.

10. The nymph-like fly of claim 8 wherein the feather is a cock feather of a ring-necked or Chinese pheasant.

11. In a method of making a fly,
securing semi-stiff strands of body material to the rear portion of a shank of a hook, in positions in which butt ends of the strands extend forwardly along the hook,
winding intermediate portions of the strands while bunched together forwardly on the shank to form substantially an entire body,
tying the strands to the shank at the front end of the body,
the strands ahead of the body being extended generally parallel to and being tied to the shank,
folding back along the shank the portions of the legs adjacent the shank,
and tying down to the shank the folded back portions of the strands in positions projecting laterally and rearwardly to form legs or hackle.

12. In a fly,
a hook having a shank,
semi-stiff strands having rear portions secured to the shank to form a body and front portions tied to the shank in positions extending at least somewhat laterally of the shank to form legs or hackle,
a head portion on the shank at the front end of the body,
the rear portions of the strands forming substantially the entire body and the front portions of the strands forming substantially the entire legs or hackle, and a second body like the first mentioned body and second legs like the first legs arranged in tandem on the shank.

13. In a nymph-like fly,
a hook having a shank,
a first body composed of barbs of a feather bunched together,
first legs of pointed ends of barbs of the feather ahead of the first body,
a second body like the first body ahead of the first legs, and second legs like the first legs ahead of the second body.

* * * * *